United States Patent [19]

Kraus et al.

[11] Patent Number: 4,599,907
[45] Date of Patent: Jul. 15, 1986

[54] MASS-FLOW SENSING TRANSDUCER

[76] Inventors: Robert A. Kraus; Edmund J. Kraus, both of 1636-T Edinger, Santa Ana, Calif. 92705

[21] Appl. No.: 725,136

[22] Filed: Apr. 19, 1985

[51] Int. Cl.⁴ .......................... G01F 1/28; H01G 5/20
[52] U.S. Cl. .................................. 73/861.74; 361/285
[58] Field of Search ................ 73/861.74, 861.71; 361/285

[56] References Cited

U.S. PATENT DOCUMENTS 2,266,316  12/1941  Martin et al. ..................... 361/285

Primary Examiner—Donald O. Woodiel

[57] ABSTRACT

A variable capacitance device generally intended for use in measuring the mass flow of air while passing through an engine-manifold. The device is capable of responding to the impingement of a stream of air on its flexible capacitor plate located within an air conveying duct, in which the impingement tends to bend the flexible capacitor plate over the curved surface of a rigid electrically insulated capacitor plate. The gradual bending of the flexible capacitor plate over the curved surface of the rigid capacitor plate changes the capacitance of the device at rate proportional to the rate of change in the mass-flow of the gas.

7 Claims, 5 Drawing Figures

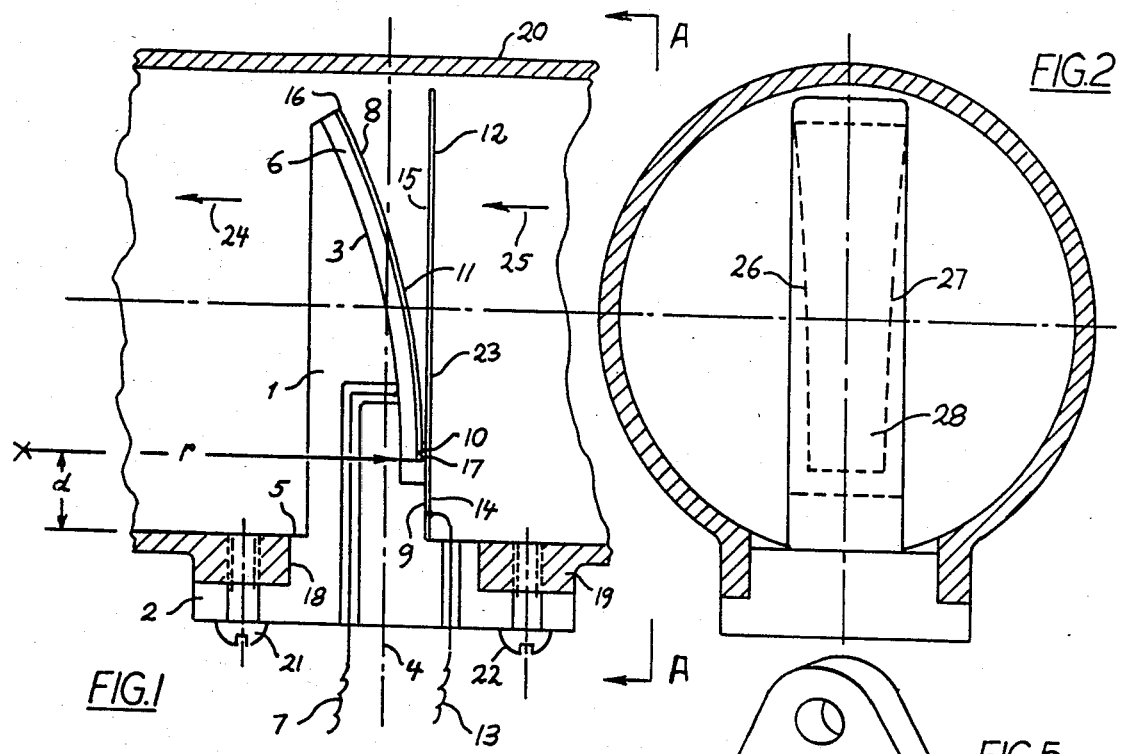
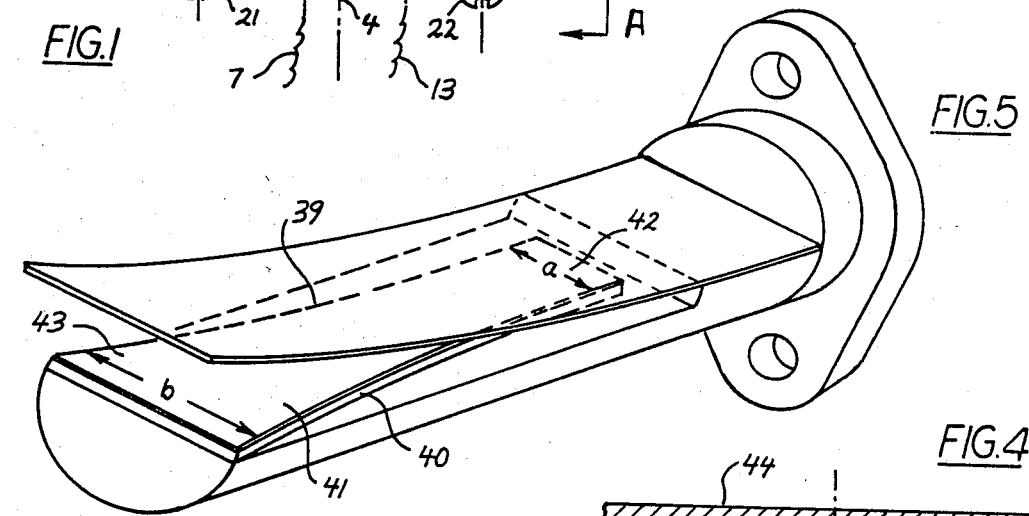
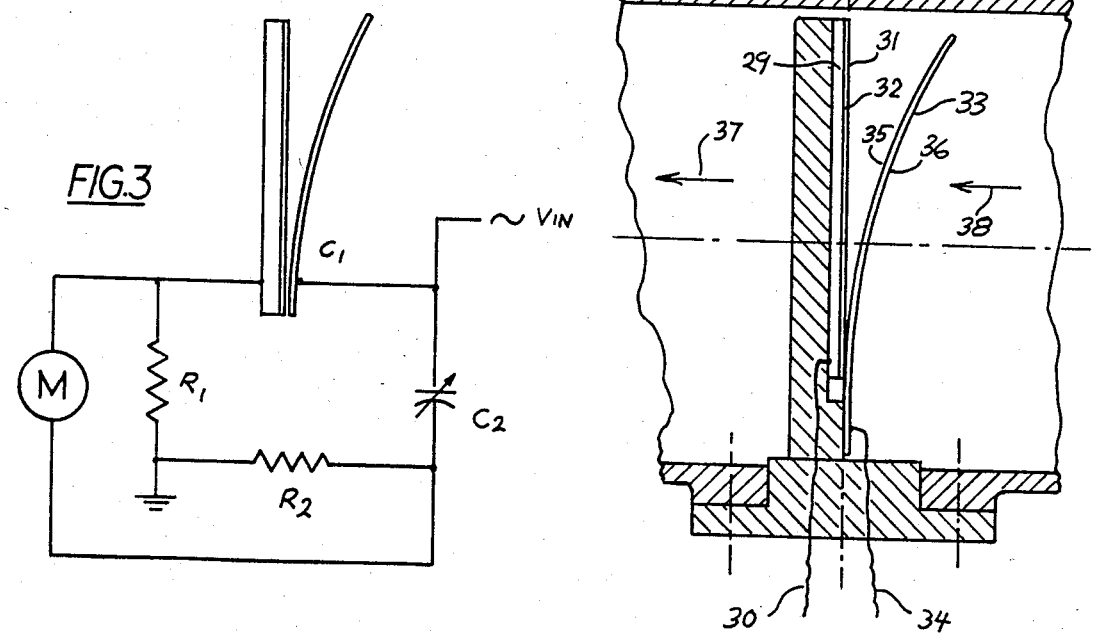

MASS-FLOW SENSING TRANSDUCER

FIELD OF THE INVENTION

This invention pertains to mass-flow sensing devices, and in particular pertains to devices whose electric output is linear with the rate of mass flow of a gas, expressed in lb per unit time.

BACKGROUND OF THE INVENTION

To achieve an optimum of efficiency in modern automotive and large stationary diesel engines, the prior art of fuel management employs several types of engine and environment condition sensing devices. Such sensing devices include, manifold absolute and barometric pressure, coolant temperature as well as distributor input rpm and throttle position sensing transducers. In many cases, the aforesaid devices are linked to a computer acting as an information processor between a set of inputs and a set of outputs. The purpose of which is to continuously monitor and readjust an engine to ever changing environmental and driving conditions. Manifold pressure and engine inlet temperature sensing transducers are some of the more commonly used devices. Most engines tolerate a wide range of fuel/air mixture. However, due to changing engine loads, fuel quality and environmental conditions, the engine must continuously be re-adjusted to achieve optimum engine performance. To assure the correctly proportioned stoichiometric air/fuel ratio of 15 lb of air to 1 pound of fuel, fuel-injected and supercharged engines require the employment of an air mass-flow sensing transducer to compensate for drastic changes in manifold pressure and temperature while operating at changing environmental conditions. The existing state of art however, includes no practical method for making single transducer measurements on the mass-flow rate of air while passing through an engine. In the prior art of fuel management, obtaining the mass-flow rate of air at a given density requires the calculating of the effects of temperature and pressure on the volume of the air. Although, in some devices of the prior art the venturi action of a carburetor in conjunction with separate manifold and barometric pressure as well as temperature sensing transducers, produces approximately correct air/fuel mixture. In other systems of the prior art, the amount of air passing through a particular engine may be determined by a computer, calculating the volume of air being drawn into the engine cylinders at a given engine speed. This takes into account the volumetric efficiency factor for the particular engine along with moment to moment barometric pressure, engine coolant, atmospheric temperature and other readings taken by the various engine connected sensors. Still other systems compute the rate of heat transfer from a heated wire or a heated surface to the engine induced air in conjunction with other engine and environment condition sensing devices in order to determine the amount of air passing through an engine at a given time. Multiple transducer systems designed to obtain the mass-flow rate of a gas at frequent changes in pressure and temperature conditions however, are too costly for use in automotive applications.

THE INVENTION

The device of the present invention is conceived to overcome the limitations of prior art, by making direct, single transducer measurements on the mass-flow rate of a gas, while taking in account frequently occurring changes in pressure and temperature conditions.

It is therefore a primary object of the present invention to provide the means for taking conditions, single transducer measurements of the mass-flow rate of a gas, wile taking into account, frequent changes in pressure and temperature conditions.

Another object of the present invention is to provide the means for taking continuous, single transducer measurements on the mass-flow rate of air while passing through an engine at changing pressure and temperature conditions, and to transmit a computer modified signal of the device's resulting electric output to a secondary device designed to correctly readjust the engine to any change in operating and driving conditions.

The features which are believed to be characteristic of the present invention, both as to their organization and method of operation, together with further objects and advantages will be better understood from the following description in combination with the accompanying drawing which we have chosen for the purpose of explaining the invention and its principles of operation. It is to be clearly understood however, that the invention is capable of being implemented into other forms and embodiments within the scope and the spirit of the defining claims by those skilled in the art; which other forms and embodiments will be fully taken advantage of.

THE DRAWING

For a more complete understanding of the present invention and the advantages thereof, reference is now made to the following description taken in conjunction with the accompanying drawing in which:

FIG. 1 represents the sectional side view of the device in accordance with the present invention at its preferred embodiment.

FIG. 2 represents view A—A of FIG. 1.

FIG. 3 represents the schematic diagram of the device's incorporated capacitance measuring bridge networks.

FIG. 4 represents an alternate embodiment of the present invention in which the rigid capacitor plate and the thereto applied dielectric is provided with a planar capacitance surface, while the flexible capacitor plate is curved substantially outward.

FIG. 5 represents the perspective view of the device in FIG. 4.

DESCRIPTION OF THE PREFERRED EMBODIMENT

The device in accordance with the present invention is generally intended for installation into the induction duct of an internal combustion engine (not being shown). Henceforth, the gas under consideration will be air. FIG. 1 shows the composition of the invention as embodied in the variable capacitance measuring device in accordance with the preferred embodiment thereof. The device comprises the capacitor support structure 1 made from an electrically non conductive material such as a suitable plastic having the flange member 2, and being provided with the narrow, cylindroidal surface 3 whose center of curvature (x) is located downstream of air movement at a point perpendicular to longitudinal center 4 at distance (d) from the lateral surface 5 of support structure 1; while radius (r), depends on the magnitude of a particular curvature suitable for the purpose. A rigid capacitor plate 6 made from a suitable material, such as aluminum of given thickness and having the electric terminal lead 7, which is securely fixed by suitable means to cylinderoidal surface 3 of support structure 1, so as to follow the curvature thereof. The rigid capacitor plate 6 is provided with a layer of a suitable, electrically insulating material 8 of a well defined thickness, such as aluminum oxide. Support structure 1 is further provided with planar surface 9 being disposed at a coplanar relationship relative with end portion 10 of curved outer surface 11 of the electrically insulating material 8. A flexible capacitor plate 12 being made from a bimetallic material having the electric terminal lead 13, is securely fixed by suitable means with end portion 14 of its inner surface 15 to planar surface 9 of supporting structure 1, and is disposed to extend parallel to center 4 substantially beyond end 16 of the rigid capacitor plate 6, so that inner surface 15 of the flexible capacitor plate 12 barely touches end 17 of outer surface 11 of the electrically insulating material 8. The so assembled components constitute the variable capacitance device in which the layer of aluminum oxide 8 of specific thickness forms a dielectric between the rigid and the flexible capacitor plates. The singular assembly comprising in combination the aforesaid components is arranged so as to protrude through aperture 18 of flange member 19 into the interior of duct 20, while being securely held by flange member 2 via screws 21 and 22 in a position at which outer surface 23 of the flexible capacitor plate 12 faces in the direction against the stream of air passing through the tube. When the system is at a zero flow condition, the flexible capacitor plate 12 tends to remain in its straight position. Hence, the included capacitance measuring bridge network in FIG. 3, which comprises the device C1, the balance capacitor C2, as well as resistors R1 and R2, remains at balance. Therefore, no emf may exist across the bridge incorporated meter, which consequently shows a zero reading.

In operation, FIG. 1, a stream of air flows within duct 20 in direction as indicated by arrows 24 and 25. Part of which air impinges on outer surface 23 of the flexible capacitor plate 12. In the collision of the air with surface 23, the exchange of kinetic energy within the air tends to push, and thereby bend the flexible capacitor plate 12 in direction of air movement over outer surface 11 of the dielectric 8, at a degree, directly proportional to the velocity of the impinging air. The bending of flexible capacitor plate 12 over the dielectric surface 11 causes a gradual increase in the area of direct contact between outer surface 11 of the dielectric 8, and the inner surface 15 of the flexible capacitor plate 12. This bending, in turn, causes an increase in capacitance between the rigid and the flexible capacitor plates. Since however the deflection of the flexible capacitor plate may not necessarily be linear with the mass-flow rate of air, correction to achieve an optimum of linearity may be made by the proper shaping of sides 26 and 27 of capacitor plate 28 as depicted by dotted lines in FIG. 2. That is to say, if for example the plotted curve of electric output versus mass-flow rate is exponential, then sides 26 and 27 of the rigid capacitor 28 plate, must each be curved either inward or outward as the case may be, at a rate equal to one half rate of non linearity. FIG. 4 depicts the sectional view of a device in an alternate embodiment, which basically comprises the same components, and therefore, in all respects functions as the device in FIG. 1. The most important difference between the preferred and the alternate embodiments may be found in the arrangement of their capacitor plates. Wherein the rigid capacitor plate 29, of the alternate embodiment in FIG. 4 having the terminal lead 30, possesses a planar surface 31 of an electrically insulating material 32. Whereas the flexible capacitor plate 33 having the terminal lead 34, and the cylindroidal inner and outer surfaces 35 and 36 respectively, is substantially curved in direction against the air movement as indicated by arrows 37 and 38. FIG. 5 shows a more comprehensible, perspective view of the device in the alternate embodiment, wherein sides 39 and 40 of the rigid capacitor plate 41 are curved outward from width (a) at end 42 to width (b) at end 43 thereof. Whereby, the curvature on each side of the rigid capacitor plate progresses outward at a rate corresponding to one-half a rate of non-linearity. As in the preferred embodiment FIG. 1, the arrangement in the alternate embodiment FIGS. 4 and 5 is fixedly disposed within an air conveying duct 44 as shown in FIG. 4, so that the flexible capacitor plate 33 may be impinged on by the stream of air. This, in turn, pushes the flexible capacitor plate 33 onto the planar surface 31 of the dielectric material 32 on the rigid capacitor plate 29. Thereby, increasing the capacitance of the device as described in the preferred embodiment.

Thus, since the cross-sectional area of the air conveying duct at the position of the sensing device is known, the volumetric rate of air flow expressed in cubic foot per unit time may easily be determined. In order to determine the mass-flow rate of air expressed in pounds per unit time however, it is necessary to compensate for frequent changes in air temperature. This is accomplished by the employment of a bimetallic material in the fabrication of the flexible capacitor plate. That is to say, by the utilization of the difference in the thermal expansion of two dissimilar metals such as Invar, having a very low temperature coefficient of expansion, and brass, having a relatively high temperature coefficient of expansion, being welded together to a strip. Wherein, a change in air temperature causes a consequential change in the spring rate of the bimetallic material used in the fabrication of the flexible capacitor plate 13; which, in turn, causes the flexible capacitance plate to deflect at a rate, directly proportional to the magnitude of air impingement at a given temperature. As in the device in FIG. 1, the device in FIG. 4 is arranged to protrude perpendicular to the direction of air flow into the interior of tube 44, so that the outer surface 36 of the flexible capacitor plate 39 generally faces upstream of incoming air, while being substantially curved toward this direction.

In operation, the flexible capacitor plate 33 is impinged on by the stream of air within tube 44. The impingement of the stream of air on outer surface 36 of the flexible capacitor plate 33 tends to gradually push the curved inner surface 35 of the flexible capacitor plate onto the planar surface 31 of dielectric 32 on the rigid capacitor plate 29. Thus, the change in the device's capacitance, functions in all respects as the device being illustrated in FIG. 1.

We claim:
1. A variable capacitance device responsive to the impingement of a stream of gas on its flexible sensing element, used for measuring the mass-flow of air expressed in pounds per unit time, comprising:
(a) a rigid capacitor plate having a narrow, cylindrical surface provided with a dielectric material of a well defined thickness, and being provided with means for connecting a terminal lead to its electrically conductive base material;

(b) a flexible capacitor plate having straight, elongated inner and outer surfaces, and being provided with means for connecting a terminal lead to its electrically conductive base material;

(c) a structure for supporting said rigid, and said flexible capacitor plates, having mounting means for being fixed to an air conveying duct; wherein, said flexible capacitor plate being fixedly arranged to extend longitudinally along said rigid capacitor plate, so that said inner surface of said flexible capacitor plate barely touches one end of said curved surface of said dielectric material, where said rigid and said flexible capacitor plates are generally disposed parallel to one another, and wherein said surface of said dielectric material is curving substantially away from said inner surface of said flexible capacitor plate; and wherein, in operation, the the impingement of said stream of air on said outer surface of said flexible capacitor plate causes the gradual bending of said flexible capacitor plate over said curved surface of said dielectric material, thereby, in turn, causing an increase in the abutting area between said rigid and said flexible capacitor plate, which is accompanied by a corresponding change in capacitance.

2. A device as set forth in claim 1 in which said dielectric material on said rigid capacitor plate is aluminum oxide at a well defined thickness.

3. A device as set forth in claim 1 in which the longitudinal sides of said rigid capacitor plate are shaped, so as to compensate for non linearity of electric output.

4. A device as set forth in claim 1 in which said flexible capacitor plate consists of a strip of bimetallic material, having two different temperature coefficients to compensate for changes in air temperature.

5. A device as set forth in claim 1 including capacitance measuring, and amplifying, electronic circuitry.

6. A device as set forth in claim 1 wherein the electric output of said device is connected by suitable means to an automobile on-board computer for purpose of controlling in combination with said computer, a automobile engine, fuel injection systems.

7. A variable capacitance device responsive to the impalement of a stream of air on its flexible sensing element, used for measuring the mass-flow of air expressed in pounds per unit time, comprising in combination:

(a) a rigid capacitor plate having an elongated, planar surface provided with a layer of a dielectric material of well defined thickness, and being provided with means for connecting a terminal lead to its electrically conductive base material;

(b) a flexible capacitor plate being provided with cylindrical inner and outer surfaces, and being provided with means for connecting an electric terminal lead thereto;

(c) a structure for supporting said rigid and said flexible capacitor plates, having mounting means for being fixed to a air conducting duct; wherein, said flexible capacitor plate is fixedly arranged to extend longitudinally along said rigid capacitor plate, so that said flexible capacitor plate barely touches one end of said planar surface of said dielectric material on said rigid capacitor plate, where said rigid and said flexible capacitor plates are generally disposed parallel to one another, and wherein said inner surface of said flexible capacitor plate is substantially curved away from said surface of said dielectric material.

* * * * *